Figure 1:
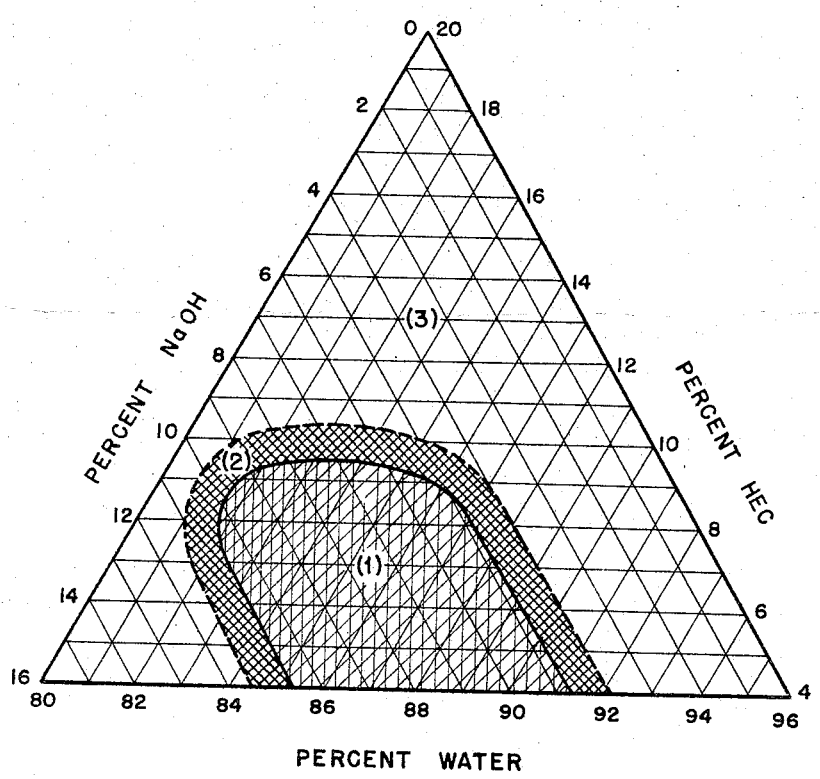

INVENTORS
REID LOGAN MITCHELL
ANTHONY A.E. COUNINIS
CHARLES F. MURPHY

BY *Pennie, Edmonds,
Morton, Barrows & Taylor*
ATTORNEYS

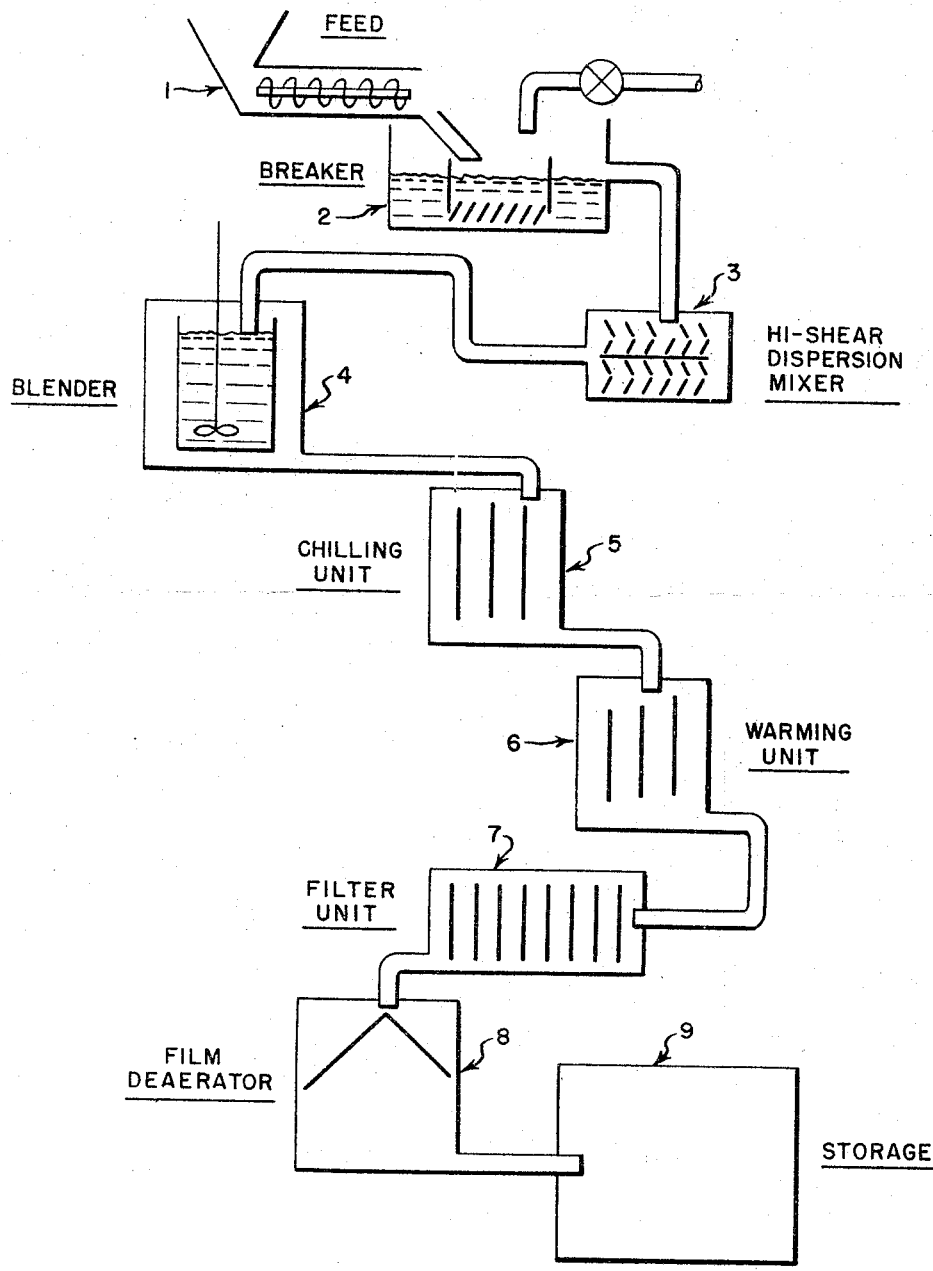

United States Patent Office 3,312,685
Patented Apr. 4, 1967

3,312,685
SOLUBILIZING HYDROXYETHYLCELLULOSE
Reid Logan Mitchell, Morristown, Anthony A. E. Couninis, East Orange, and Charles F. Murphy, Morristown, N.J., assignors to Rayonier Incorporated, Shelton, Wash., a corporation of Delaware
Filed Oct. 30, 1962, Ser. No. 234,127
1 Claim. (Cl. 260—232)

This invention relates to hydroxyethylcellulose (HEC) and has for its object the provision of an improved process for dissolving HEC in aqueous solutions of sodium hydroxide to form clear filterable solutions. The invention is concerned with the solubility in dilute sodium hydroxide solutions of HEC having a range of ethylene oxide substitution varying from 3.8 to 4.2% which is a water insoluble chemical compound.

Depending upon the amount of ethylene oxide substituted on the cellulose, an HEC can vary from complete water solubility to insolubility in 18% sodium hydroxide solution. When the amount of ethylene oxide substitution varies from about 2% up to about 8% by weight the HEC is insoluble in water but soluble in solutions of sodium hydroxide varying from 5 to 10% provided chilling is employed.

Notwithstanding the substantial solubility characteristics of HEC having from 3.8 to 4.2% of ethylene oxide in dilute aqueous solutions of sodium hydroxide, there has been no certain or reliable means of efficiently dissolving the HEC to obtain clear and filterable solutions. In order to utilize HEC for forming clear films, and the like, it is necessary to have a clear and filterable solution—one that is free of haze and fiber residues.

This invention is based on our discovery of a rather critical relationship between the concentration of HEC and the concentration of sodium hydroxide employed in formulating mixer compositions which will lead to the production of clear solutions which can be filtered in a practical manner. In order for a solution to be filterable in practicable commercial operations, it must be practically free of slimy material comprising highly swollen fibrous residues that plug the filter. Also, in order to be clear the solution must be substantially free of insoluble fragments which cause hazy films.

This composition phase of the invention is best illustrated by a triangular diagram which defines the relationship between the HEC concentration and the sodium hydroxide concentration in the solution to form clear solutions which can be filtered without difficulty.

In the accompanying drawings
FIG. 1 is a phase diagram on triangular coordinates which shows the area of clear filterable solutions of the invention, and
FIG. 2 is a diagrammatic illustration of an arrangement of apparatus for carrying out a process of the invention.

At this time it is generally well known how to treat cellulose so as to effect both uniform alkalization and uniform etherification to produce HEC containing from 2 to 8% of substituted ethylene oxide which is substantially all soluble in dilute sodium hydroxide solutions but insoluble in water. Such an operation is described in the Mitchell et al. Patent 2,847,411. However, this invention is concerned with HEC having a very narrow range of ethylene oxide substitution which varies from 3.8% to 4.2% of ethylene oxide based on the oven dry weight of the HEC, for in this range of substitution, particularly useful for film manufacture, the concentration of HEC can be related to a particular sodium hydroxide concentration which removes the guess and chance of forming clear filterable solutions in practical commercial operations.

The invention is preferably and advantageously carried out in a sequence of operations which disperse and solubilize the HEC having a particular amount of ethylene oxide substitution in a particular sodium hydroxide solution.

To obtain optimum benefit from the described critical formulations, especially in high HEC, low-alkali compositions referred to as "lean" solutions, we have found that it is unexpectedly advantageous to employ a short-cycle continuous pump-through mixing sequence as illustrated schematically in FIG. 2. This concept is utilized in preferred form to produce in a 10–20 minute cycle a solution of surprisingly good filterability. Normally, the dissolving of cellulose derivatives requires long-cycles (2–4 hours) mixing in batch operations in which heavy work is done in mixing, much heat generated and much cooling required.

In the process of the invention, the HEC in crumb form (with or without residual alkali from reaction) is fed simultaneously with dilute sodium hydroxide liquor in proportions such as to give compositions falling within the light shaded area of FIG. 1, through a sequence of operations in an arrangement of apparatus as illustrated in FIG. 2. In this apparatus the HEC and sodium hydroxide solution in admixture is fed into a beaker which feeds continuously through a high-shear dispersion mixer, into a blender, then through a chilling unit to solubilize, then a warming unit, filter unit and a continuous deaerator of the falling film type, providing in less than 1 hour a solution ready for casting that would usually take 48 hours to prepare in the practices heretofore known.

The feed can be carried out with a screw type device 1 which deposits the mixture into an Abbe Mixer or alternately, a Baker-Perkins Vissolver (partially filled) or equivalent equipment of the same type as a continuous breaker which wets out all the fibers instantaneously and uniformly at the desired composition thus avoiding the tendency of HEC to aggregate into gelatinous lumps which dissolve poorly. The fibrous slurry then overflows into a high-shear mixer 3, such as a Reitz Disintegrator, Oakes pipeline mixer, Cowles high-shear mixer or equivalent equipment. Solution from the high-shear mixer passes continuously into a blender 4 in which the solution is agitated with an impeller and then passes into a chilling unit 5 operated short of freezing (i.e., 5° C.) which may be a De Laval plate cooler or a Vogt scraped surface cooler. The stream is then passed through a warming unit 6 to warm and decrease the viscosity prior to filtration and deaeration. Filtration can be carried out in plate and frame type unit 7, preferably fitted to utilize either back washing and nylon felts, or plain cellulose filters. Deaeration is preferably carried out in a film deaerator 8 of the thin film flash-off type. The entire mixing sequence can be automated to save time, labor and at the same time produce superior HEC solutions with respect to freedom from undissolved fiber residues.

As shown in FIG. 1, the invention is concerned with solutions containing from 4% to about 10% of HEC by weight. The area 1 above 4% HEC shown in light shading is the area of filterability of the invention and the area 2 shown in dark shading outside the solid inside curve line shows that there is a very narrow transition zone indicating some slight variation between the boundaries.

The following example illustrates operations of the invention carried out in the apparatus of FIG. 2.

*Example 1*

Moist fibrous HEC crumb containing 15% NaOH by weight and 35% HEC with ethylene oxide substitution closely controlled between 3.8 and 4.2% of the dry HEC weight was metered by the screw feeder 1 together with an accurately proportioned flow of caustic solution into the breaker 2 to give a solution of composition 8.0% HEC–7.0% NaOH. This uniformly wet-out slurry of fibrous HEC is pumped continuously through the high-shear mixer 3, the blender 4, then through the plate cooler 5 in which the solution is chilled to about 5° C. The solution at this point has a filtration plugging value of 1800 compared to plugging values of 50 or less for chilled but unfrozen solutions from commercially available HEC. The chilled solution is pumped into the plate heat exchanger 6 and rewarmed to 20° C., filtered in standard plate and frame presses 7 and continuously de-aerated in the vacuumized falling film unit 8. The time required for the complete cycle to this point is about 20 minutes. The de-aerated filtered solution is available immediately for casting as a packaging film with physical strength comparable to cellophane and having improved dimensional stability.

*Example 2*

Moist fibrous HEC crumb containing 15% NaOH and 35% HEC with ethylene oxide substitution carefully controlled between 3.8% and 4.2% was metered by the screw feeder 1 together with an accurately proportioned flow of caustic solution into breaker 2 to give a uniformly prewet fibrous slurry of composition 9.0% HEC–5.6% NaOH. This "lean" composition has a more economical NaOH content from a raw material cost standpoint than the composition cited in Example 1. The fibrous slurry was continuously passed through the high-shear mixer 3, through the blender 4, then through the scraped-surface heat exchanger 5 in which it is chilled to about 5° C. At this point the solution attains a filtration plugging value of 500 compared to 20 or less for chilled but unfrozen solutions from commercially available HEC. The chilled solution is rewarmed to 25° C. in the scraped wall heat exchanger 6, filtered in standard plate and frame filter presses 7, and continuously deaerated in a vacuumized falling film unit 8. Time required for the complete cycle to this point is about 15 to 20 minutes.

The filterability of HEC in sodium hydroxide solutions increases with decreasing temperature and at 5° C. it is over 99.8% soluble in 7% sodium hydroxide solution. After only momentary chilling the solution can be rewarmed without adversely affecting filtration. For practical purposes it is desired to filter the solution in the temperature range of from 20 to 30° C. The data for forming the curves of FIG. 1 which defines the areas was obtained by making filterability determinations on various HEC-sodium hydroxide solutions to establish the points on which the curves are based. The solid curve enclosing area 1 defines a minimum filtration plugging value of 300 gm. per sq. cm.

The HEC on which the triangular diagram was based contained 4.0% of ethylene oxide by weight. HEC containing up to 4.2% of ethylene oxide or as low as 3.8% would not give significantly different diagrams. The solution may be formed by making a good dispersion of the HEC in a solution containing, for example, about 7% sodium hydroxide. For "lean" compositions with a more economical NaOH content the same amount of HEC by weight can be dispersed in a solution containing, for example, only 5.6% NaOH.

Area 1 shown in light shading in FIGURE 1 establishes the limits of HEC concentration and NaOH concentration which give clear solutions of HEC which are filterable in practical commercial operations similar to viscose filtration.

In area 2, shown in dark shading, the transition zone bounding area 1, clear solutions are formed but these are not filterable in any practical operation because of higher content of partially undissolved particles which tend to plug the filter medium rapidly.

Compositions in area 3 are not filterable and include a variety of hazy colloidal dispersions, fibrous slurries, and opaque gels.

The criterion for determining the characteristics for the different solutions is as follows:

Solutions or dispersions of HEC (4.0% ethylene oxide) at different concentrations are mixed with solutions of sodium hydroxide of different concentrations as described. These mixtures are placed in clear beakers for visual observation for clearness, haze and fibers. The mixtures are subjected to filtration evaluations as measured by the plugging values. In the process for measuring plugging values a quantity of solution to be tested is forced by 40 p.s.i.g. air pressure through a given area of standard filter medium such as Johnson and Johnson Rapidflo Filtocott. Solution passing through the filter is collected and weighed at timed intervals until the filter becomes plugged, or until enough data is obtained to estimate the plugging value graphically. The plugging value represents the weight in grams of solution which will pass through one square centimeter of standard filter medium before the filter is completely plugged and flow stops. The products containing residual fibers, fiber fragments and slimy residues do not filter effectively as they soon plug the filter and stop the operation. Minimum practical plugging values for commercial operations would be 50 to 100 gm. per sq. cm., and desired levels would be at least 300 to 500 gm. per sq. cm.

Solution appearance changes somewhat from region to region in the phase diagram. Gel and hazy areas are whitish and opaque while the filterable and clear dispersions range from clear and white at low HEC levels to clear white and light honey colored at higher HEC concentrations depending on length of standing time.

We claim:

The improved process for forming clear and filterable solutions of hydroxyethylcellulose which comprises dissolving hydroxyethylcellulose containing from 3.8 to 4.2% of substituted ethylene oxide based on the oven dry weight of the hydroxyethyl cellulose in an aqueous solution of sodium hydroxide, the concentration of hydroxyethylcellulose and the concentration of sodium hydroxide in the solution being defined by area (1) of FIG. 1 of the drawings, said solution being accomplished by use of a continuous mixing sequence in which hydroxyethyl cellulose crumb and sodium hydroxide solution are fed simultaneously into a pre-mixing stage, then into a high-shear dispersion stage, chilled short of freezing to solubilize, warmed, and filtered.

References Cited by the Examiner

UNITED STATES PATENTS

| | | | |
|---|---|---|---|
| 2,036,257 | 4/1936 | Craik | 260—232 |
| 2,090,808 | 8/1937 | Richter | 260—232 |
| 2,714,938 | 8/1955 | Smith. | |
| 2,763,030 | 9/1956 | Erickson | 106—197 X |

LEON J. BERCOVITZ, *Primary Examiner.*

L. P. QUAST, R. W. MULCAHY, *Assistant Examiners.*